(12) United States Patent
Smith

(10) Patent No.: US 8,155,899 B2
(45) Date of Patent: Apr. 10, 2012

(54) EFFICIENCY METER FOR PHOTOVOLTAIC POWER GENERATION SYSTEMS

(76) Inventor: Gregory Smith, Tucson, AZ (US)

( * ) Notice: Subject to any disclaimer, the term of this patent is extended or adjusted under 35 U.S.C. 154(b) by 0 days.

(21) Appl. No.: 12/969,774

(22) Filed: Dec. 16, 2010

(65) Prior Publication Data

US 2011/0270546 A1   Nov. 3, 2011

(51) Int. Cl.
*G06F 1/28* (2006.01)
(52) U.S. Cl. ........................................ 702/60
(58) Field of Classification Search ........ 702/60
See application file for complete search history.

(56) References Cited

U.S. PATENT DOCUMENTS

| 2008/0272279 | A1* | 11/2008 | Thompson | 250/206 |
| 2009/0152664 | A1* | 6/2009 | Klem et al. | 257/440 |
| 2009/0283129 | A1* | 11/2009 | Foss | 136/244 |
| 2010/0277002 | A1* | 11/2010 | Folts et al. | 307/82 |
| 2011/0140656 | A1* | 6/2011 | Starr et al. | 320/109 |
| 2011/0224839 | A1* | 9/2011 | Thompson | 700/297 |

* cited by examiner

*Primary Examiner* — Cindy H Khuu
(74) *Attorney, Agent, or Firm* — Turk IP Law, LLC

(57) ABSTRACT

A portable instrument for displaying an efficiency metric for a photovoltaic power generation system based on an estimate of the source power available from the photovoltaic modules. The source power is a value scaled from the rated DC source power computed with data from irradiance and temperature sensors or from a photovoltaic sensor's deviation from a rated level of power generation. A ratio of output power divided by source power is one measure of efficiency and relates to the health of the physical photovoltaic power generation system.

19 Claims, 11 Drawing Sheets

EFFICIENCY METER FOR PHOTOVOLTAIC POWER GENERATION SYSTEMS

BACKGROUND

A solar cell is a device capable of converting the energy of sunlight directly into electricity by the photovoltaic effect. Assemblies of cells are commonly used to make solar modules, also known as solar panels. The energy generated from these solar modules is an example of solar energy.

Solid-state photovoltaic cells are photosensitive diodes. When cells are exposed to light, photons elevate the energy of electrons within the diode material to a mobile state. Under proper electrical bias these free electrons flow from the diode to through the bias network, As a result, radiant energy is transformed to electrical energy.

Solar cells are often electrically connected and encapsulated as a module. Solar cells are also usually connected in series in modules, creating an additive voltage. Connecting cells in parallel will yield a higher current. Modules are then interconnected, in series or parallel, or both, to create an array with the desired peak DC voltage and current. Photovoltaic modules often have a sheet of glass on the front (sun up) side, allowing light to pass while protecting the photovoltaic cells from the elements (rain, hail, etc.).

To make practical use of the solar-generated energy, the electricity is often fed into the electricity grid using inverters (grid-connected photovoltaic power systems). In stand-alone power systems, batteries are used to store the energy for later access. In addition, solar panels can be used to power or recharge portable devices.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to photovoltaic power system efficiency meters that may be utilized to determine power system efficiency. According to some embodiments, photovoltaic power system efficiency meters may estimate and report a metric related to system efficiency for photovoltaic power generation systems. Embodiments may utilize sensors responsive to irradiance and temperature and provide a calculation of the power system's efficiency.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
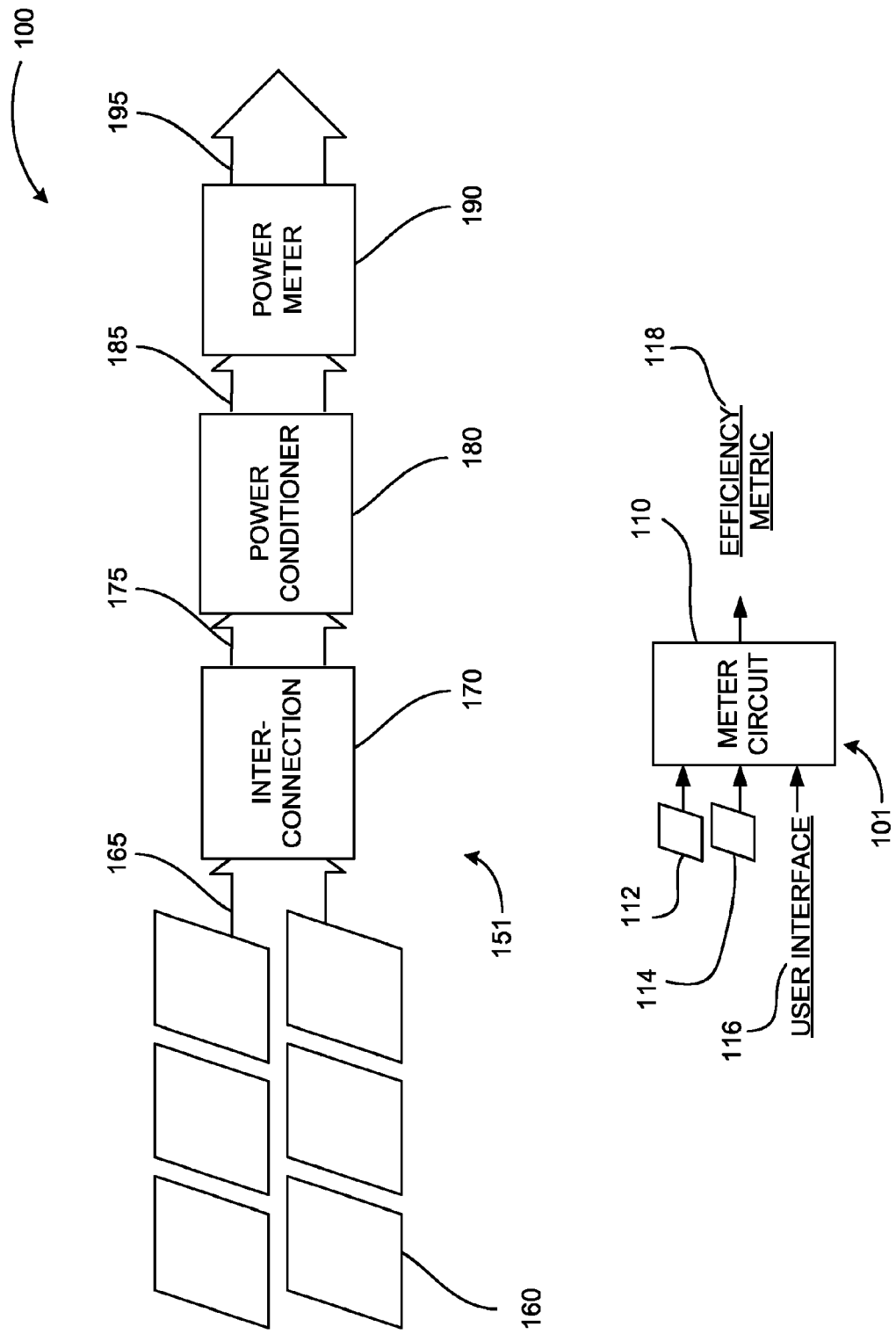
FIG. 1 is a diagram illustrating the components of a photovoltaic power generation system and an autonomous instrument capable of estimating the efficiency of the photovoltaic power generation system.

As briefly described above, portable photovoltaic power system efficiency meters may be utilized to determine efficiency of photovoltaic power generation systems in situ. Herein 'power system' or 'photovoltaic system' is used to indicate an established photovoltaic power generation system. The term power 'source' is used to indicate the power valuable from the photovoltaic modules in a photovoltaic power generation system. The term power 'output' is a term that herein indicates the total power systems' output power. According to some embodiments, photovoltaic system efficiency meters may estimate and report a metric related to system efficiency for photovoltaic power generation systems. Irradiance measurements may be used to partially estimate a module's instantaneous non-Standard Test Conditions (STC) peak DC source power. It should be noted that STC typically exists only at the manufactures test site, rarely ever in the 'real world'. STC is used herein as a term meant to indicate any arbitrary set of test conditions not likely to occur at the time of efficiency measurement. Additionally, module source power may be correlated to cell temperature. In some embodiments, power system's cell temperature measurements or estimates may be used to accurately predict a module's instantaneous non-STC DC source power. A calculation of the instantaneous non-STC module power may be required for determining the power system efficiency. According to other embodiments a photovoltaic system may utilize irradiance and temperature measurements and provide a calculation of the power system's efficiency. Other embodiments may utilize direct measurement of an efficiency meter's sensor's power when exposed to irradiance to estimate the power system's efficiency.

In the following detailed description, references are made to the accompanying drawings that form a part hereof, and in which are shown by way of illustrations, specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Installers, owners and maintainers of photovoltaic power generation systems understand and expect that the instantaneous output power generation from a photovoltaic system may be less than the sum of the instantaneous peak source power available from the individual photovoltaic modules. Peak power, as used herein, refers to power available at the Maximum Power Point bias for each module. Low output power generation may exist even when the environmental conditions match those under STC, which are commonly used to rate the modules. Reasons for low output power generation may include many systemic factors reducing output power that can be generated by sum of the power system's individual modules. For example, several components of electrical heat loss may exist between the modules output terminals and the power conditioners' output circuit. Examples of electrical heat loss may include, but are not limited to, resistive conductors, connection terminals, overcurrent protection devices, disconnect switches, and also the power loss within the power conditioning units.

Other examples of efficiency loss may include modules that may not be biased for their individual peak power. The power conditioner may fail to bias the network of modules to their combined peak maximum power point. As a result, there may be inefficiency in providing an optimal bias. The optimal bias may be constantly changing with dynamic irradiance levels, and may require tracking by the power conditioner. As a result, an optimal bias may not exist at all times and therefore overall system efficiency is reduced from optimal.

At a manufacturers' production line, untested modules may produce a broad distribution of power levels. As such, modules may be graded by the manufacturer into separate narrow power ranges. While these ranges may be narrow (typically ±5%), there may be a variation of power produced by modules within a single grade, resulting in a mismatch of power generated within each series connected string of modules. The mismatched strings may not all be biased at the individual string's peak bias voltage for maximum power production. As a result, module mismatch may reduce the optimal maximum power theoretically available at the individual module level. Some modules may be biased at a point other than their Maximum Power Point.

Another factor for possible power loss may occur during elevated ambient temperature conditions, where power conditioners may reduce output power in order to limit the conditioner's internal circuit temperature. Additionally, a reduction of source power may occur with time due to the aging and soiling of the modules. Systemic degradation may occur with corrosion of conductor termination contacts and increased module mismatches due to unequal rates of module aging. Examples of factors effecting module aging may result from darkening of the transparent layers protecting the cells and corrosion of cell connections internal to the modules.

Yet other physical factors may include non-uniform orientation of the modules at installation and partial shading of the modules during the day. At times, individual DC fuses may clear due to localized over-current faults, limiting total system output current. In larger systems, open DC fuses may go unnoticed when only the system's output power is monitored. This is possible because the daily range of irradiance is great enough to mask smaller but important shifts in system efficiency.

Above described and other effects may be categorized as physical losses. The health of a photovoltaic system may be qualified by the deviation of total losses from an expected value. The typical pre-aging efficiency existing at the time of a photovoltaic system's initial installation may be typically on the order of 0.75 to 0.85. Such pre-aging efficiency may result in a power system that may be capable of converting 75% to 85% of the DC source power produced by the photovoltaic modules into output power. Long-term aging effects may be expected to be on the order of 0.5% degradation per year.

The metric of efficiency may be used to quantify the power system's total losses accurately. A majority of the individual system related losses may be difficult to measure individually. Efficiency and loss factors may be often estimated from a theoretical analysis rather than actual measurements. Embodiments may avoid reliance on such estimates and directly measure a photovoltaic system's overall efficiency.

By way of illustration, several operational definitions and equations describing efficiency of a photovoltaic power generation systems are listed below and used to assist in the following discussion of the merits of an efficiency meter.

Efficiency=output instantaneous power/sum of modules' instantaneous peak source power. Efficiency may be less than unity, as system losses may be always prevalent. Low efficiency may flag possible defects in the system that may require repair, cleaning or other maintenance procedures.

EF=Environmental Factor=EF1*EF2. The primary EF components may be the level of irradiance and power system's cell temperature. These values may be dependent on seasonal changes, time of day, latitude of installation, clouding, and weather. Measured irradiance values may be used to modulate the rated or STC value of module power to the actual instantaneous power by the scalar: EF1=measured-irradiance/1000 W/m$^2$. It should be noted that for this discussion, 1000 W/m$^2$ relates to the industry standard acceptance of "STC", however, modules according to embodiments may be rated with values other than this particular value and the equation may be modified to reflect the value of irradiance used for testing of the power system's specific modules.

The power system's cell temperature may scale a STC value of module power to the instantaneous power value by the factor: EF2=(1−(measured-cell-temperature−25° C.)*power temperature-coefficient). The power temperature-coefficient may be the specified rate of change of module power with temperature, divided by the nominal power value. Similarly, the STC temperature of the module(s) may be other than 25° C. Temperature-coefficient may have the units of 1/° C. This coefficient may usually be available in the module's manufacturer's data sheet. These first order linear expressions for EF may be illustrative and may be sufficient. However, they may not exclude higher order equations relating irradiance and temperature measurements to module power generation that may better model the relationship.

$$\text{Output instantaneous power}=\text{Efficiency}*\text{instantaneous non-STC source power} \quad [1]$$

In the relationship expressed in equation [1], both output power and source power may be the instantaneous power values at the time of measurement. The source power may be the sum of the system's module peak DC source power. The system output power level may be less than the source (sum of module) power level because Efficiency may be less than unity. Output power may be a value that may be available either from the power conditioner display or by an output power monitoring service or meter. Module DC source power may need to be estimated as it may be rarely measured directly due to significant additional hardware expense.

$$\text{Instantaneous non-STC source power}=\text{system STC rated power}*EF \quad [2]$$

Equation [2] makes the algebraic statement that the peak instantaneous non-STC module power may be the sum of all of the system's module STC power values, or system STC rated power, multiplied by the Environmental Factor (EF). EF may be greater or less than unity.

$$\text{Instantaneous output power}=\text{Efficiency}*\text{system STC rated power}*EF \quad [3]$$

Equation [3] combines the previous two expressions [1] and [2], indicating the direct influence on output power of the two factors; environmental, EF, and the physical system loss factor, Efficiency. Equation [4] is derived from equation [3].

$$\text{Efficiency}=\text{output power}/(\text{system STC rated power}*\text{EF}) \quad [4]$$

Embodiments may include the ability of an efficiency meter's circuits to compute a form of this expression. One form of the information provided by the efficiency meter may be a direct calculation of Efficiency. Another form may be the ratio of Efficiency to its expected value. In general the efficiency meter may generate an efficiency metric that estimates overall power loss in a photovoltaic power generation system independent of prevailing environmental conditions. It is recognized that power system losses may have some dependence on EF and therefore the two primary efficiency factors may have interdependence. For example power system's losses may have some dependence on ambient temperature. Such effects are still of interest and validate the importance of an efficiency meter to help identify such effects.

True instantaneous non-STC DC source power, in theory, may be directly measured at the output terminals of all individual modules. However, it may be an expensive solution for determining the value of the source power. Direct power monitoring at the module level has the shortcoming that it does not indicate the peak power available from the module should the module not be biased at the maximum power point. Deviation from peak power operation is one component of efficiency loss. As such, direct module power measurement may not be a common option.

Photovoltaic systems utilizing module level DC-DC power optimizers may report individual module power and therefore do not require estimation of instantaneous source power from environmental measurements. However, such power systems may only exist in specialized circumstances where the array may be located where partial shading of the modules may not be avoided. Most photovoltaic systems may not suffer from this constraint. Power systems that do not include DC-DC optimizers for 100% of the modules may still benefit from an efficiency meter.

The instantaneous non-STC DC source power of a system may be estimated with a reference cell or module. None of the system's active modules may be used as a reference; since measuring an active system module's DC open or short circuit characteristics or other electrical parameter may interfere with the system's continuous power production. Estimating the active DC source power generated by a permanent separate photovoltaic module may not be useful because aging and soiling of the module may eliminate two of the critical efficiency factors needed to determine a power system's overall efficiency. Also, a dedicated module for reference may be expensive. The instantaneous non-STC DC source power of a system may be closely and inexpensively estimated with data from a compact photovoltaic reference cell. A reference cell may be a standalone reduced-area photovoltaic cell with electrical characteristics representative of the modules' photovoltaic cells. A reference cell may allow a portable instrument to contain the means to estimate instantaneous non-STC DC source power of an adjacent photovoltaic system.

For large photovoltaic systems, an irradiance sensor may be a precision thermo-pile type pyranometer. Separately a direct temperature-sensing element may often be attached to the back of a single active system module. Alternatively, an anemometer may be included for determining how wind speed effects power system's cell temperature through convection cooling. An combined pyranometer, power system's cell temperature sensor, and possibly an anemometer may serve as a weather station and may be an accurate method of estimating deviation of the real time environmental operating conditions from those of a STC. However, the station may involve substantial hardware and complex communication systems. A permanently mounted pyranometer, either semiconductor based or an accurate thermo-pile type, also may have a disadvantage of becoming soiled and may be subject to aging. These measurement systems may have long time exposure to the elements. Therefore, periodic maintenance and calibration may be required to verify that measurement instruments themselves do not suffer an accelerated time dependent shift in their accuracy.

A typical figure for the preferred maximum expense of power monitoring of a photovoltaic system may be in the range of 0.5% of the total system cost. For this reason, smaller photovoltaic systems may not financially justify full-scale weather stations. A significant reduction in expense may result if environmental sensors were portable and therefore could be utilized with multiple power systems. One example may be a hand held efficiency meter for estimating efficiency of an adjacent photovoltaic power generation system according to embodiments. Such an efficiency meter may not require long-term exposure to weather and therefore soiling, extreme ambient temperature and moisture. Additionally, it may be more immune to shifts in sensor accuracy. Other objectives of such an efficiency meter may be to provide a measurement method that may be easy to implement, intuitive to use and as accurate as expensive embedded weather stations. The efficiency meter may be useful for photovoltaic system installers at the time of a system's commissioning and may be used by system's owners or maintainers to verify proper system operation and warn of a need to repair system components or possibly to clean the modules.

Other users of an efficiency meter may be utility companies or power providers that possibly purchase the photovoltaic power generated and require a convenient means to verify the systems efficiency. Quality assurance engineers and Operations and Maintenance personnel may require an independent audit of a system's efficiency as part of a performance assessment and may benefit from an autonomous efficiency meter. An accurate efficiency meter may be useful for determining aging of a power system, which may be critical for determining whether a system's components comply with a manufacturer's or installer's performance warranties.

An exemplary embodiment of an efficiency meter may include two parts, environmental sensors and a user interface. A user interface may require a simple keypad for entering required power system parameters and may require a means of displaying power system input information and computed parameters. One embodiment of the efficiency meter may include a photovoltaic reference cell sensor to emulate the relative electrical response of a photovoltaic system's modules to sunlight and cell temperature. Even though a reference cell may be of small area, it may be the reference cell's percentage change from its own STC calibrated power level that may be used to predict a similar change in adjacent photovoltaic system's modules' change in source power. An efficiency meter's sensors may need to be exposed to full sun, and match the orientation of the system modules toward the sun. Alternatively, the sensors may be located at some reasonable distance from an actual photovoltaic power generation system, assuming that on a clear or uniformly cloudy day, the irradiance difference seen by the modules and the efficiency meter may not be significantly different.

An efficiency meter may be used in proximity to a photovoltaic system's power conditioner so that the system's output power may be read directly from the power conditioner's display. Another option may be to operate the efficiency meter at the module location and for an assistant to remotely read and communicate readings of a conditioner's display or another output power-monitoring meter's display. Another option may be a means for a photovoltaic system's power meter to communicate to the efficiency meter wirelessly. Some photovoltaic power generation systems may employ micro-inverters or AC modules. These systems may convert DC to AC at each photovoltaic module. Application of an efficiency meter may be valid for these power systems, as long an AC revenue grade power-meter or other means exist for providing the user of the efficiency meter, or transferring to the meter directly, the value of the photovoltaic system output power.

The general purpose of an efficiency meter may be to provide an immediate and accurate estimate of a photovoltaic system's efficiency in the presence of instantaneous non-STC irradiance and power system's cell temperature, or in other words, 'real world' conditions. For one example of sensors implemented with a single photovoltaic reference cell for irradiance and possibly cell temperature, the efficiency meter may provide a means to obtain the following data in order to perform an efficiency calculation:

The photovoltaic reference cell's short circuit current to estimate irradiance.

The photovoltaic reference cell's open circuit voltage or the reference cell's voltage at a reference bias current, or multiple bias currents, or optionally a direct temperature sensor attached to the reference cell for estimating the temperature of the power system's cells.

A means for transferring to an efficiency meter the following power system details; the number of modules in the system, the rated STC power of the modules, or the product of these two values, and the value of instantaneous system output power.

With the above input information, an efficiency meter may calculate and display any metric related to the efficiency of a photovoltaic system. In addition, it may optionally display the prevailing irradiance and cell temperature. Other embodiments may utilize and display more metrics than those listed in this example. Further embodiments may use other types of irradiance and cell temperature sensors or other methods of estimating the photovoltaic system's instantaneous source power. More detail on these technologies and example operations is provided below.

FIG. 1 includes diagram 100 illustrating the components of a photovoltaic power generation system 151 and an autonomous photovoltaic efficiency meter 101. Power generation system source power 165 may be derived from an array of photovoltaic modules 160. The number of modules in such an array may vary from a single module to thousands of modules. Each of the broad arrows 165, 175, 185 and 195 may represent transfer of power from one stage of the power system to the next. The sum of the individual modules' peak source power may be represented by 165. For this theoretical model, it may be assumed that each module may be biased to its maximum power point, which may not be possible to implement in actual power systems when module mismatch occurs.

Block 170 may represent a system's module array 160 to power conditioner 180 interconnections, which may include a network of conductors, conductor terminations, switches and fuses, among other components. Power 175 available to the power conditioner 180 input may be less than that of power level 165 due to losses in the interconnections 170. An example of a power conditioner 180 may be an inverter. Another may be a battery charger, or possibly the combined functions of both a battery charger and an inverter. There may exist multiple power conditioners in a system where the output power 185 represents the sum of the power conditioners' power. The power 185 provided by the power conditioner 180 may be less than the power 175 available at the input of the power conditioner 180. This may be due to the efficiency limitation of the power conditioner's power conversion circuitry. Power loss within a power meter 190 may be assumed to negligible. Therefore, system output power 195 may be assumed to be effectively the same as the power conditioner output value 185. It may be an exemplary goal of a photovoltaic efficiency meter 101 to estimate the ratio of the photovoltaic power generation system output power 195 divided by the photovoltaic power generation system source power 165, or a similar metric useful for estimating efficiency of a photovoltaic power generation system 151.

An efficiency meter 101 may contain or have access to an irradiance sensor 112 and cell temperature sensor 114. Both sensors 112 and 114 may be oriented to a direction similar to a photovoltaic power generation module array 160. The sensors 112 and 114 may measure the primary environmental parameters that may match those acting on an adjacent power system 151. An efficiency meter's circuit 110 may receive information from sensors 112, 114, and user interface information 116. User interface information may include specifications defining the module array's 160 total rated STC power. Another user interface may be the value of the system's output power 195 reported by the output power meter 190. The meter circuit's output 118 may include a power system efficiency metric relating the magnitude of system output power 195 to the estimated value of system source power 165. One embodiment of the efficiency meter may include direct communication of the value of power system output power 195 from the power meter 190 to the efficiency meter's circuit 110, bypassing a need for receiving this information from a user interface 116.

Figure 2:
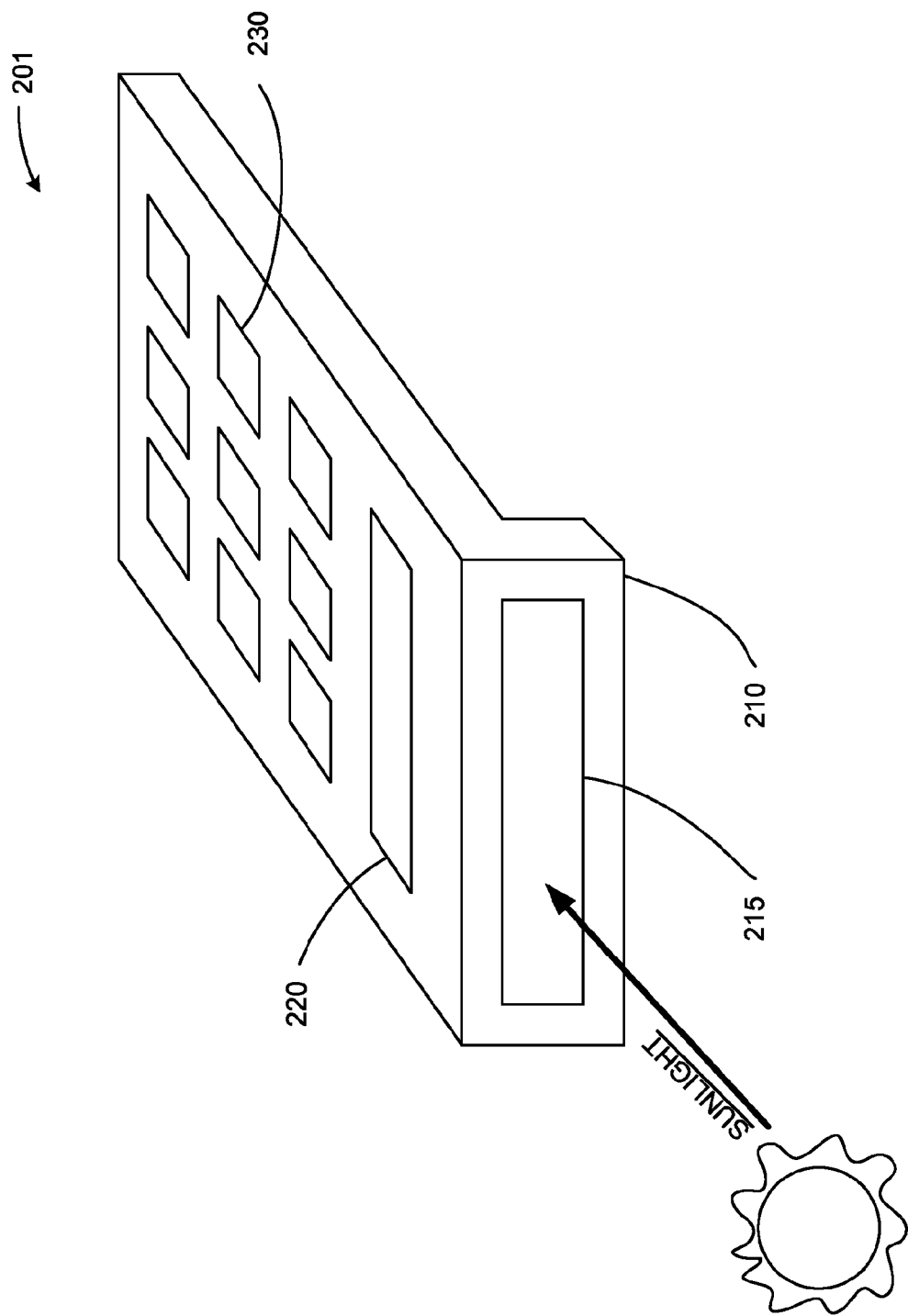
FIG. 2 illustrates a hand held photovoltaic efficiency meter and external features.

FIG. 2 illustrates a hand held photovoltaic efficiency meter and external features 201. In this example embodiment, a housing of an efficiency meter 210 may be one example of many possible form factors that may provide the general function of an efficiency meter in a single hand-held unit. A photovoltaic reference cell 215 may serve as both an irradiance sensor and temperature sensor. In other embodiments, the sensor functions could be provided by separate sensors or by other types of sensors. Sensors may be either integrated into an enclosure or externally connected through a port (not shown) on housing 210. The electrical behavior of a silicon photovoltaic reference cell 215 may closely represent a relative relationship between the prevailing irradiance and photovoltaic source power demonstrated in general by monolithic and poly-crystalline photovoltaic cells, as well as many thin-film photovoltaic materials. Other embodiments may involve measurement techniques that characterize a reference cell's instantaneous cell's peak power. This may require that a range of reference cell current or voltage is applied and the point of maximum power generated by the reference cell is stored. The reference cell still responds to irradiance and temperature, however this method avoids the need to determine the actual level of irradiance and temperature. The relative level of reference cell peak power may be used to estimate the photovoltaic power system's source power. A reference cell's electrical signal in response to terrestrial sunlight may be calibrated at an efficiency meter's 201 manufacturer for a desired accuracy utilizing a laboratory-standard source of irradiance. Other methods may be utilized for calibration such as comparing the response of an efficiency meter 201 to a set of calibrated standard measurement instruments in the field under different environmental conditions and adjusting the efficiency meter 201 response to match the response of the calibrated standard equipment.

Another embodiment may include a connection for an anemometer (not shown) in order to allow wind speed to be incorporated into an estimation of power system's cell temperature. Yet another embodiment of an efficiency meter may be an option to connect to external irradiance sensors (not shown) such as a dedicated pyranometer or a complete photovoltaic cell representative of a particular manufacturer's module. A user interface may consist of one or more displays 220 and a keypad 230. The keypad 230 may be located on the surface of the housing 210 most conveniently viewed by the user, shown as the top view in FIG. 5. In the embodiment shown, user interface functions 220 and 230 may be orthogonal to sensor(s) 215, which may allow a user interface to be viewed while avoiding direct line of sight with the sun. Optionally, an efficiency meter 201 may contain or connect to a printer (not shown) for producing a paper copy or connect another form of data media for transfer of particular measurement results. Another embodiment of an efficiency meter 201 may contain wired or wireless communication circuitry for communication to other systems such as cellular phone networks, monitoring systems, or instrument controllers as possible examples. An efficiency meter 201 may contain a mechanical connection means (not shown) for attaching the efficiency meter to a mounting device used for establishing a desired orientation for a meter's sensor(s) 215.

At the time of measurement, the efficiency meter's photovoltaic reference cell 215 may need to be pre-aligned to match the azimuth and tilt of the photovoltaic modules. Azimuth is the compass angle of tilted modules. Tilt is the angle between the plane of a module and a horizontal plane. Methods of matching an efficiency meter's 210 orientation to a power system's modules may include, but not limited to, resting an efficiency meter 210 on a pre-aligned platform, or mounting an efficiency meter 210 on a tripod aided with a compass and inclinometer for adjusting orientation to match the system's modules. Another method may be to hold or clamp an efficiency meter 210 along the edge of an active module within a power system so that the meter's photovoltaic reference cell is in a plane parallel to the power system cells.

Figure 3:
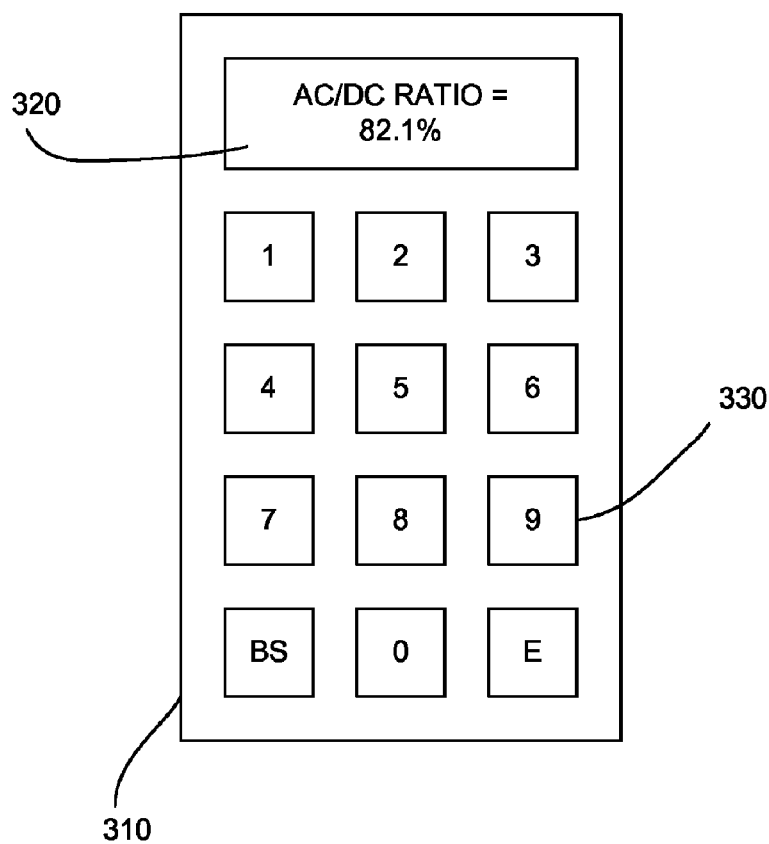
FIG. 3 illustrates an example user interface according to an embodiment.

FIG. 3 illustrates an example user interface 310 of an efficiency meter 301. An example of a user interface may contain an alphanumeric display 320 that may be utilized to display various input and output functions and parameters. Keys from a keypad such as 330 may be utilized for numeric data entry. In an embodiment, a key labeled "BS" may be used to backspace or delete previous keypad entries for modification of parameter values. A key labeled "E" may designate entry for storing presently displayed numeric values. Also an "E" key may advance the meter's display and function mode to the next operation in a flow of information exchange. According to one embodiment, the display 320 in the example of FIG. 3 may report the value of AC output power of a grid-tie inverter divided by the DC source power of a photovoltaic array as an efficiency metric. The implementation of an efficiency meter may not be limited to one embodiment of keypad formats or labels. Other formats and form factors may also be utilized to achieve a general set of user interface functions. A keypad and display may be discrete components or may be part of touch screen or other software interface. A user interface may exist in another separate component in other implementations of an efficiency meter.

Figure 4:
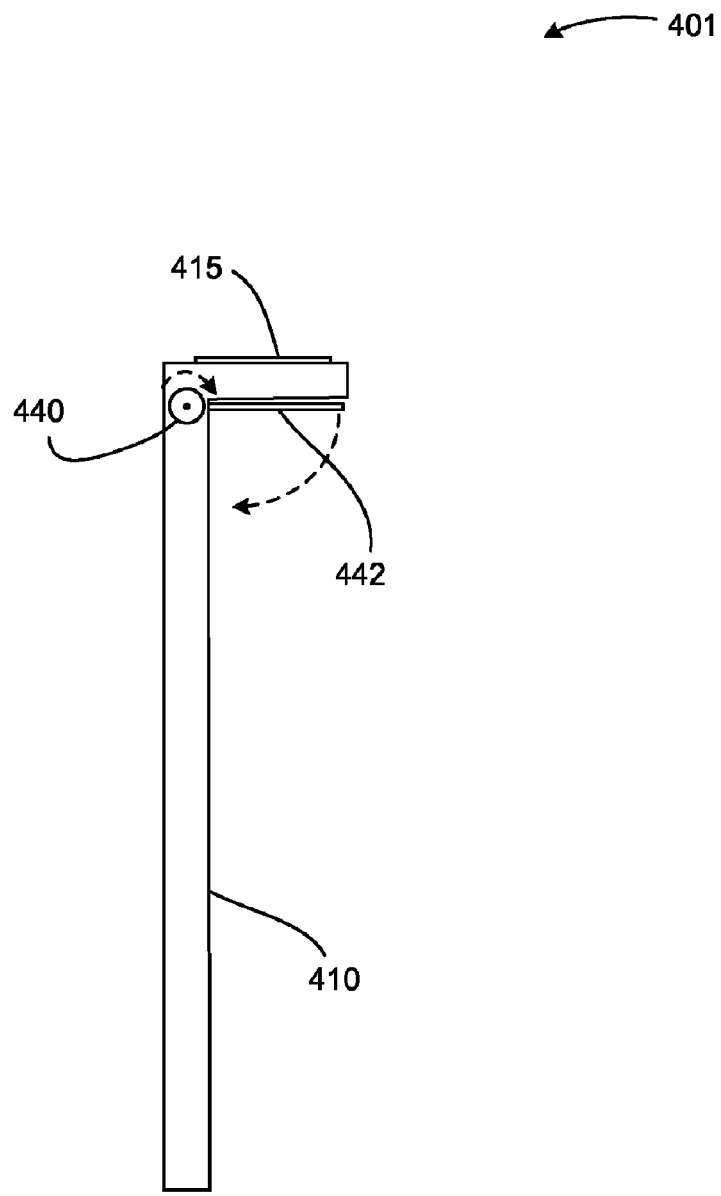
FIG. 4 illustrates a side view of a sensor shield according to an embodiment.

FIG. 4 illustrates a side view 401 of a sensor shield according to an embodiment. In an example, a housing 410 may contain irradiance and temperature sensors 415 on a surface orthogonal to the side view of housing 410. Another embodiment may contain a cover or shield 442 which may cover the backside of a temperature sensor 415 to restrict airflow on the side of a sensor 415 not facing sunlight during measurement. When the cover is in a closed position (counter-clock-wise rotation in FIG. 4) a cover or shield 442 may restrict air flow behind a sensor 415 in order to emulate the self-heating experienced by power generation system photovoltaic modules that may be installed with limited air circulation on the modules surface opposite the sun-exposed surface. A knob 440 may be provided to rotate a cover or shield 442 away from a temperature sensor 415 (clockwise following the arrows' paths in FIG. 4) allowing airflow on the backside of sensor 415, so that sensor 415 may emulate the temperature change of power generation system modules that may be installed in a way that provides free air space on their back surface.

The systems and implementations of photovoltaic efficiency meter for power generation systems discussed above are for illustration purposes and do not constitute a limitation on embodiments. Photovoltaic efficiency meter for power generation systems may be implemented employing other modules, processes, and configurations using the principles discussed herein.

Figure 5:
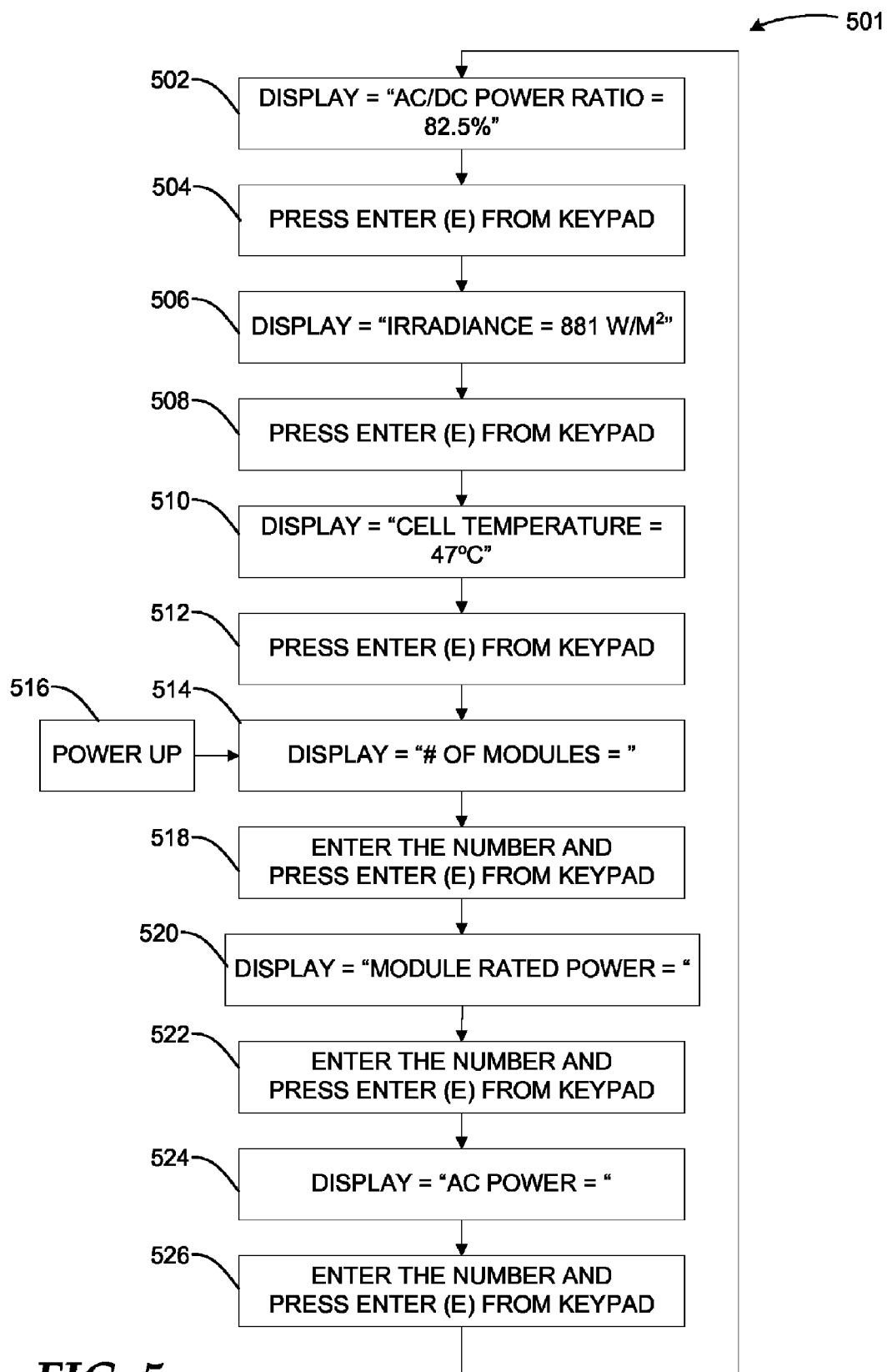
FIG. 5 illustrates a flow diagram for an example interaction between the user and an efficiency meter via a keypad and display according to some embodiments.

FIG. 5 illustrates a logic diagram for an example interaction between the user and an efficiency meter via a keypad and display according to embodiments. Upon power up 516, a display may request that the total number of modules in a power system be entered 514. Typing the number via a keypad 518 may allow this information to be displayed. Pressing an Enter or "E" key 518 such as was illustrated in the example of FIG. 5, may provide a means for storing user-supplied information in a controller. In an embodiment, once the number of modules in the system of interest is saved, a display may then request that the power system's module nameplate or rated power be entered via the keypad 520. Pressing an Enter or an equivalent key 522 may enter the appropriate information, and the rated power value may be saved. In other embodiments, there may exist a communication link between a photovoltaic power system's output power meter and the efficiency meter, thereby eliminating a need for keypad entry of the output power value 522.

Other embodiments may access the value for number of modules and the rating of the modules, or possibly their product by other means. It may be possible that these values or other power system parameters may have been saved in memory and recalled, either at power up, by software, identification code, or initiated by a user. In such an arrangement, multiple systems' parameters, such as electrical characteristics of a specific module type, may be saved in memory and 'loaded' by means other than a direct keypad entry. Returning the flowchart, the next display mode in this example may be the value of the system output power 524 presently being generated. In this example, the power conditioner may be assumed to be an inverter and the output power may be AC. Once system's output power value is saved in the efficiency meter's memory 526, a controller may compute the photovoltaic system's instantaneous non-STC DC source power based on the sensor's data, the product of the saved number of modules and the saved individual rated DC module power value. The ratio of AC output power divided by the computed DC source power may be displayed 502. Reporting a metric such as this ratio, or another metric indicative of power system efficiency may be a primary purpose of an efficiency meter. The metric reported by an efficiency meter may indicate how the physical system is performing independent of the stronger environmental influence of irradiance and power system's cell temperature.

The order, format, form, and exact set of values entered and displayed in other flowchart embodiments may differ from that shown in FIG. 5, yet still remain within the scope of the efficiency meter's general intended function. Subsequent presses of an Enter key (504, 508) may also display a level of irradiance in W/m² 506 and estimated power system's cell temperature in degrees C. 510 as illustrated in FIG. 5. For this example, The "E" or entry keys at step 512 returns the flow to the starting point.

Other embodiments may provide an estimate of instantaneous DC source power, date and time of day, among other parameters. Other sequences may exist in other embodiments of a flow chart. Multiple selectable flows, options and formats may exist within a meter in order to adapt to different situations. Other power conditioners than inverters may be represented in this and other flows. In other embodiments of a flowchart, additional input values may include such values as different values of temperature coefficient of module power, nonlinear coefficients for irradiance and temperature, and expected power system efficiency level. Some embodiments may provide for non-volatile memory to preload previously entered system data into the flow. Other embodiments may exclude some system data entries from the loop and only require they be entered or viewed once. Yet other embodiments may allow some measured and computed values to be averaged with subsequent passes through a flowchart loop. Further embodiments may include automatic looping 501 of a measurement cycle and storage of data in data-log memory, either internal or external to an efficiency meter.

Figure 6:
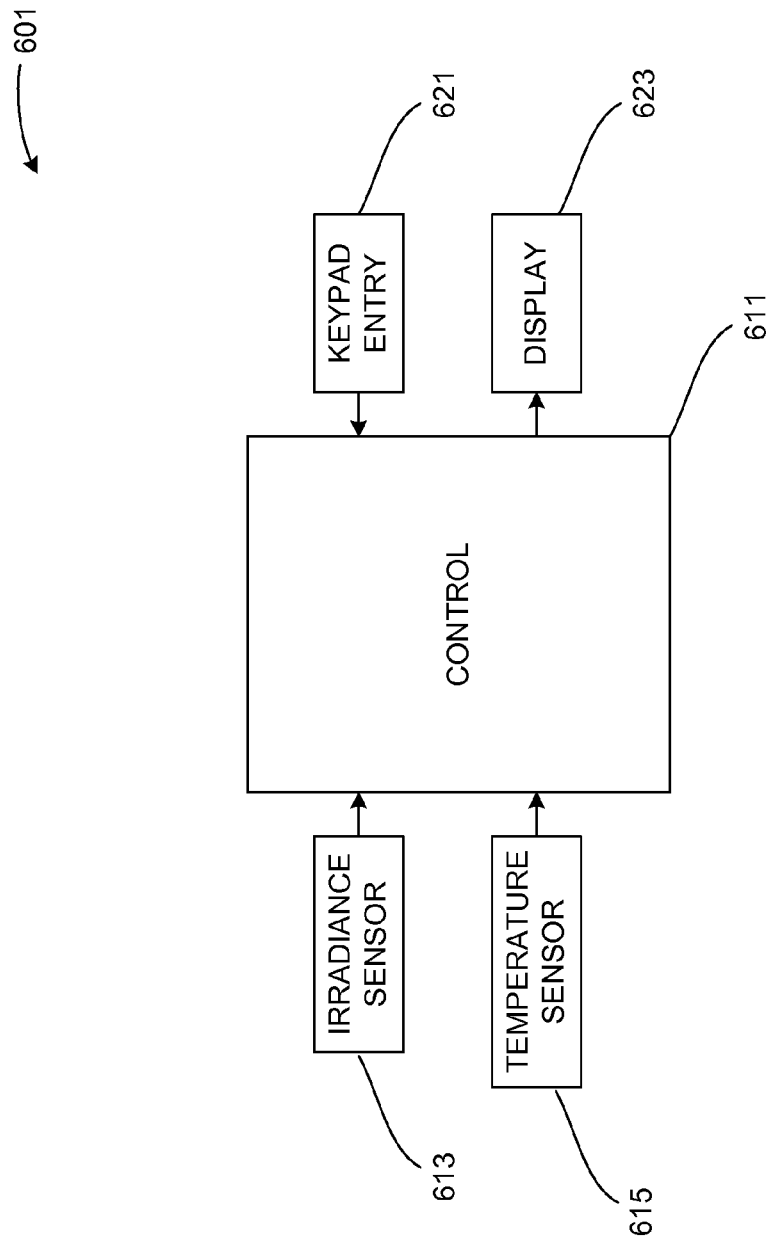
FIG. 6 is a block diagram of an efficiency meter's circuitry.

FIG. 6 is a block diagram 601 of an efficiency meter's circuitry. A control circuit 611 receives input data from an irradiance sensor 613, a temperature sensor 615, and a keypad 621. Based on this and other optional sensor data interfaces (not shown), multiple desired input and computed output values may be sent to a display 623. Sensors 613, 615 may be separate, a single unit, or externally connected. Other sensor types may also be utilized. Other methods of estimating photovoltaic system source power from light-sensitive sensors may be utilized. A control function 611 may contain a real time clock for generating and reporting time stamps of requested measurements.

While FIG. 6 illustrates some basic functionality, other embodiments may contain controls, interfaces and drivers for internal or external printers, and external connections for programming, firmware updates, diagnostics or data exchange with other instruments or appliances. Further embodiments may utilize wired or wireless transceivers for communication or reporting of measurement results or communication of system output power level from a system power meter to the efficiency meter. A control block 611 may contain memory and memory management circuits or external memory interface circuits necessary for data logging of measured and computed parameters. Power supply electronics (not shown) may contain power management systems for various internal and external circuits and may contain charging circuitry for rechargeable batteries. Yet other embodiments may contain circuitry for determining the azimuth and tilt of the sensors 613 and 615 or other sensor orientation parameters.

Figure 7:
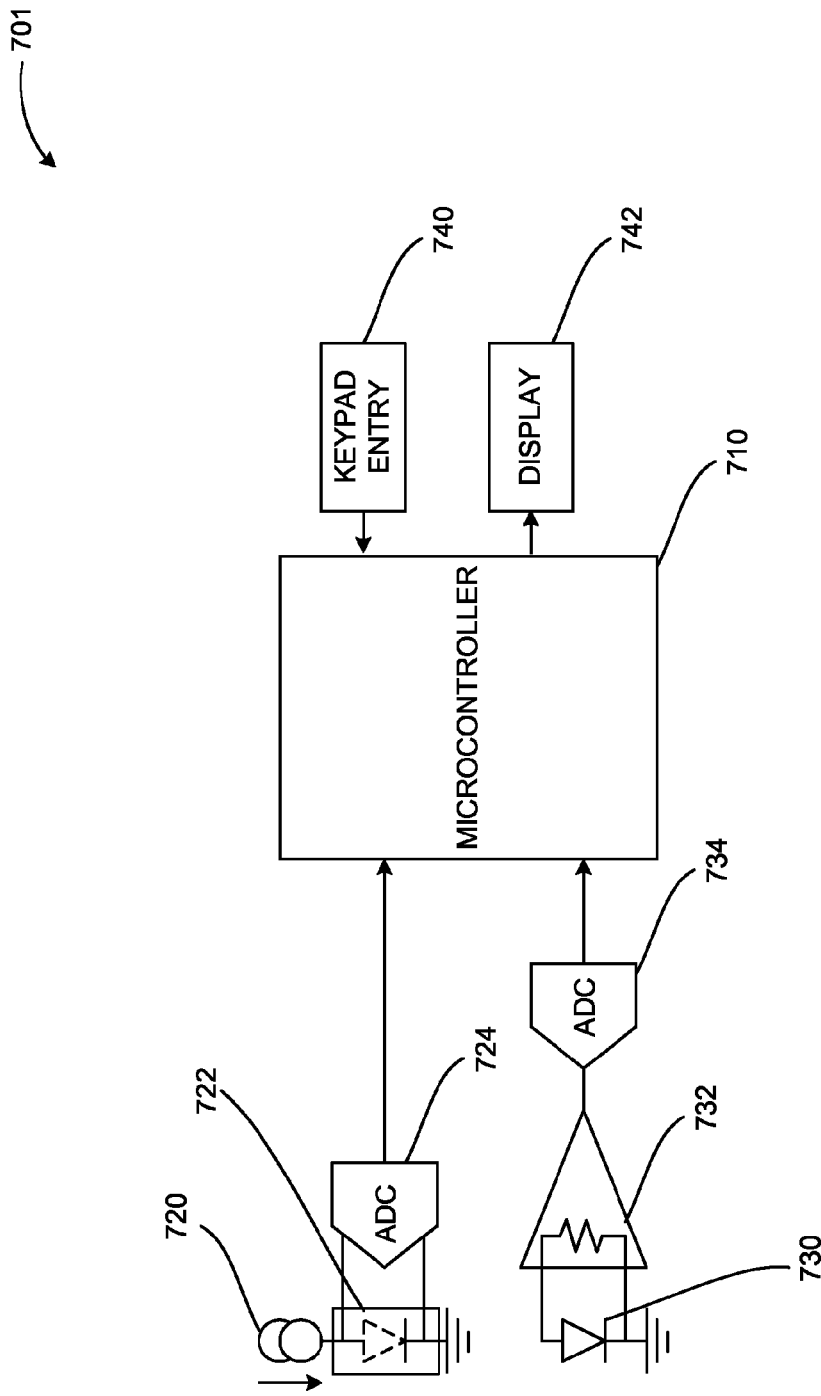
FIG. 7 illustrates an example electrical schematic for implementing the block diagram of FIG. 6.

FIG. 7 illustrates an example electrical schematic 701 for implementing the block diagram of FIG. 6. Control may be implemented with a programmable microcontroller 710. Keypad 740 and display 742 may be implemented with either hardware components that interface directly to the microprocessor 710, or may be individually integrated into a touch screen or other software based interface. One method of temperature measurement may be implemented by a current source 720 that may bias a diode 722 that may be exposed to the same intensity of sunlight as the power system's modules. It may be desirable for diode 722 to exhibit light absorption characteristics similar to that of the power system's modules so that diode 722's sunlight induced temperature rise may nearly track the temperature rise of the system modules. It may be assumed that both the modules and a diode 722 are exposed to similar ambient air conditions and temperature. A known value of current bias 720 and the measured value of diode 722's voltage may correlate to diode 722's temperature. Optionally, a second value of bias current 720 may be applied to diode 722, whereby the resulting difference in diode voltage drop may provide a differential signal that may be linearly dependent to absolute temperature of diode 722. Either type of temperature related voltage signal may be digitalized by an analog-to-digital-converter (ADC) 724 and the digital result may be stored by a microcontroller 710.

Diode 722 of a temperature sensor circuit may be a photovoltaic reference cell. The irradiance sensor may also be implemented with a light sensitive diode 730 or photovoltaic reference cell exposed to the sunlight intensity similarly exposed to the system modules. The short circuit current of the reference cell diode 730 may be measured by an amplifier 732, the amplifier 732 output signal then may be converted by an analog-to-digital converter 734 and the resulting digitized signal may be stored in a microcontroller 710. A linear correlation of short circuit of a photovoltaic cell and irradiance may be well established for a broad range of photovoltaic cell materials. Amplifier 732 illustrates one example of a circuit that may be capable of biasing a photovoltaic reference cell 730 to nearly zero volts with a low value of sense resistor, shown internal to amplifier 732. The voltage across amplifier's 732 sense resistor represents the product of a known value of sense resistor and a photocurrent generated by a reference cell 730. Amplifier 732 in this embodiment may have a specific value of gain necessary to amplify the sense resistor's voltage. Another embodiment of the amplifier circuit 732 may be to alternatively replace the sense resistor shown internal to the amplifier 732 with a high value of resistance connected as a negative feedback path from the output of the amplifier 732 to the reference cell 730's anode.

Calibration of each sensor circuit's signal magnitude, transfer function, and second order effects may be required as part of the manufacturing process of the efficiency meter. Diodes 722 and 730 may be a single diode, and analog to digital converters 724 and 734 may be a single data converter implemented with additional switches (not shown) that time multiplex the connections shown in FIG. 7.

Assuming the diode 722 is implemented with a photovoltaic reference cell, yet another embodiment of the circuitry may incorporate sweeping the bias current source 720 value and measuring reference cell 722's voltage such that the maximum power point of the reference cell 722 is determined This is one method for measuring the maximum power point of the reference cell. This approach eliminates the need to directly measure either irradiance and cell temperature. Thereby, the measured reference cell 722 maximum power point and a stored reference cell 722 STC value may be used to estimate a similar scalar for determining the power generation system modules instantaneous non-STC source power. This embodiment may not require two sensors if the single sensor diode 722 represents sensitivity to both irradiance and temperature in a manner similar to the power system's cells. The schematic 701 illustrates one implementation of possible circuitry, however other circuit methods may be used and circuits may differ with the utilization of different sensor types.

Figure 8:
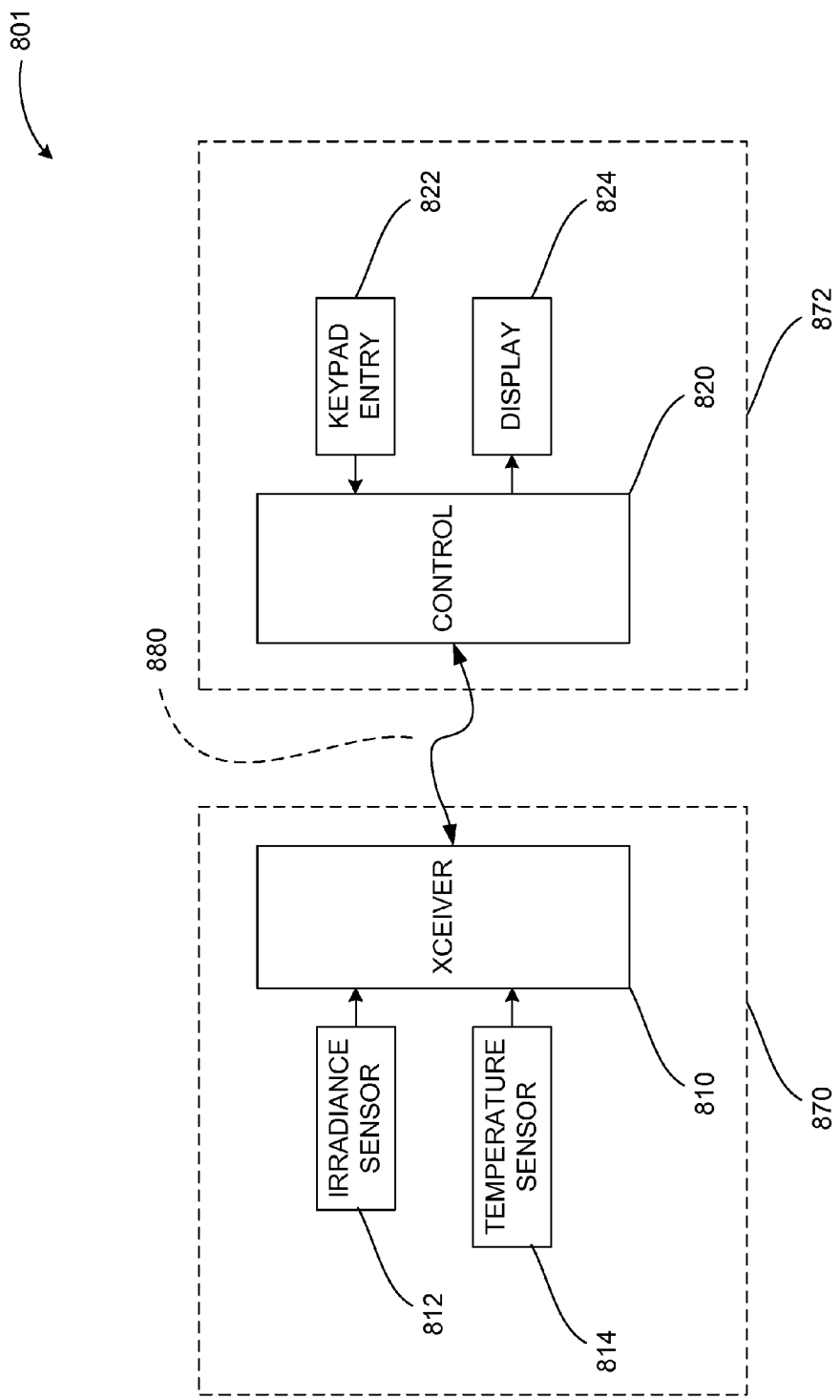
FIG. 8 illustrates another embodiment of the efficiency meter partitioned into two units to facilitate the remote operation of the user interface.

FIG. 8 illustrates another embodiment of the efficiency meter partitioned into two units to facilitate the optional remote operation of the user interface in diagram 801. A control circuit 820 and keypad, 822 and display 824 may form a user interface unit 872. Sensors for irradiance 812 and temperature 814 may be integrated with a transceiver 810 in a second unit 870. Functionality of this embodiment is similar to previously described embodiments, however this embodiment allows for sensors to be located in a different location from a portable user interface unit. A communication link 880 between units 870 and 872 may be achieved through either wired or wireless communication methods. It may be assumed that the control circuit 820 may have the capability to directly communicate with the transceiver 810. Embodiments similar to FIG. 8 may allow multiple sensor units 870 to be located adjacent to or within a single or multiple photovoltaic system sites. Multiple sensor units 870 may then communicate to a single user interface unit 872 or a plurality of single user interface units 872. Conversely a specific sensor unit 870 may then communicate to a single or multiple user interface units 872. Such embodiments may require a method of assigning identification codes within each specific sensor unit 870 so that a particular user interface unit 872 may be able to uniquely communicate to a unique sensor unit 870.

A means of assigning an identification code for communication for a particular sensor unit may include a set of identification code switches, implemented in either hardware or software. Assigning an identification code for communication for a user interface may be an addition step in a flowchart for an interface unit 872's data entry, including however not limited to, allowing a user to provide a specific sensor unit identification code. The identification code may also allow the user interface to recall from memory the size and STC details of the photovoltaic system array required for calculating efficiency. A separate user interface unit 872 may have a benefit of not requiring precise azimuth and tilt orientation and exposure to full sunlight that is characteristic of a sensor unit 870 or to an efficiency meter housed in a single unit. One embodiment of a user interface 872 may include programming and utilization of a personal communication device, mobile communication device, smart phone, portable computer, a personal digital assistant, or other suitable appliance to perform user interface functions and execute flowchart functions similar to those described in the example embodiments. Such an embodiment may utilize the above listed wireless communication appliances capable of communicating with a sensor unit 870.

Figure 9:
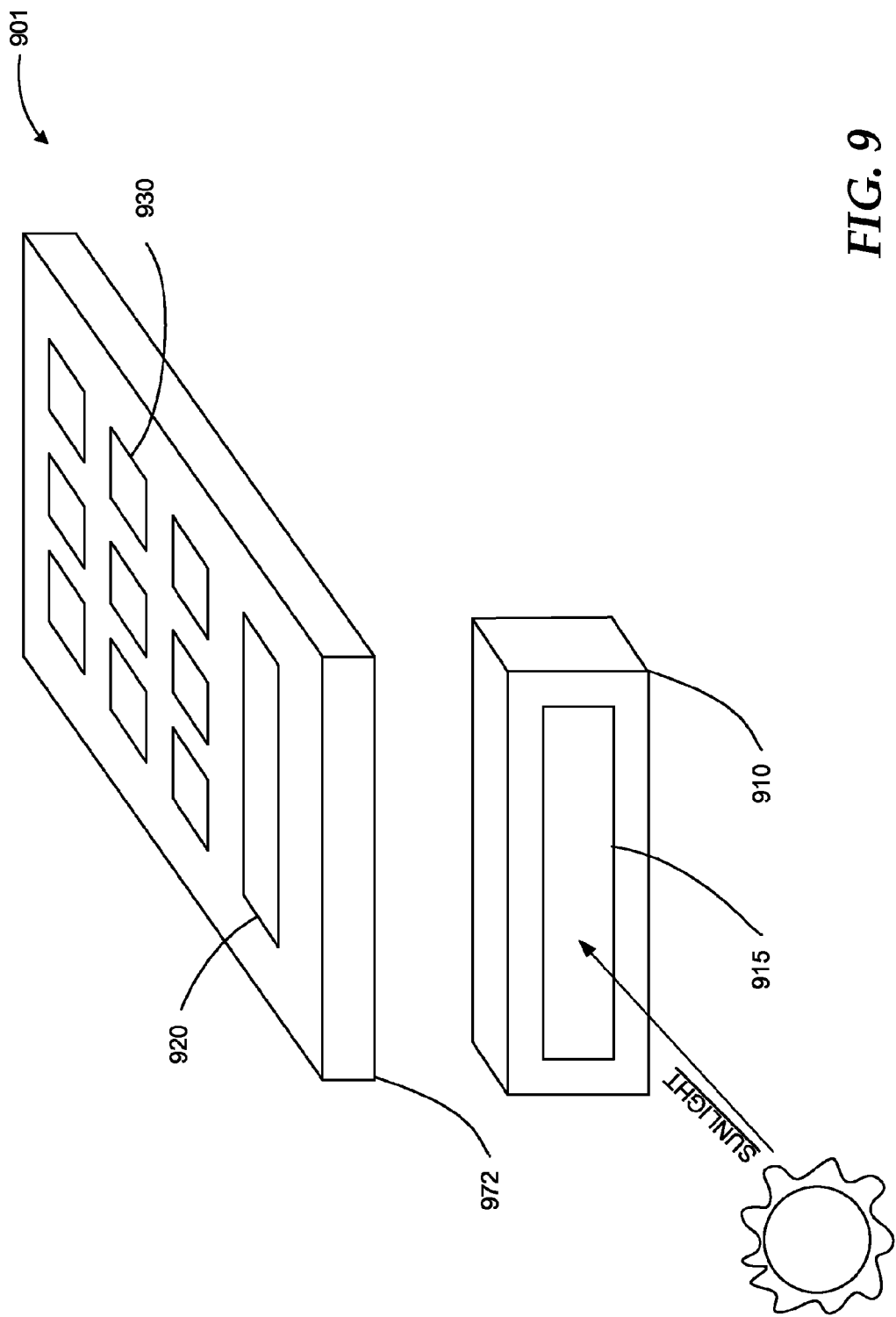
FIG. 9 illustrates the embodiment of FIG. 8 in a perspective view of a hand held photovoltaic efficiency meter and external features in two housings.

FIG. 9 illustrates the embodiment of FIG. 8 in a perspective view of a hand held photovoltaic efficiency meter and external features in two housings 901. Sensor housing 910 may contain sensors for irradiance and temperature, shown as a single sensor 915 in this embodiment. Sensor housing may be temporarily positioned in proximity to a photovoltaic power generation system, preferably with an orientation matching that of the power system's modules. Sensor housing 910 may be mounted permanently. However, this embodiment may require a means to protect sensors from the effects of soiling and aging if these two factors of power loss are to be assessed as part of an efficiency metric. Protection of a sensor housing 910 may be in the form of enclosures that are moved at the time of efficiency metric measurement.

In FIG. 9, one embodiment of a user interface is illustrated by the example housing 972. A user interface may contain a display 920 and keypads represented by 930. Each housing type may contain compatible wireless communication circuits so that a single or multiple sensor housings 910 may be able to share data with a single or multiple interface housings 972. A user interface housing 972 may be implemented with a portable computer, personal communication device, or other suitable appliance. Sensor housing 910 may contain a mechanical connection means (not shown) for attaching to a mounting device used for establishing a desired orientation for a meter's sensor(s) 915.

Figure 10:
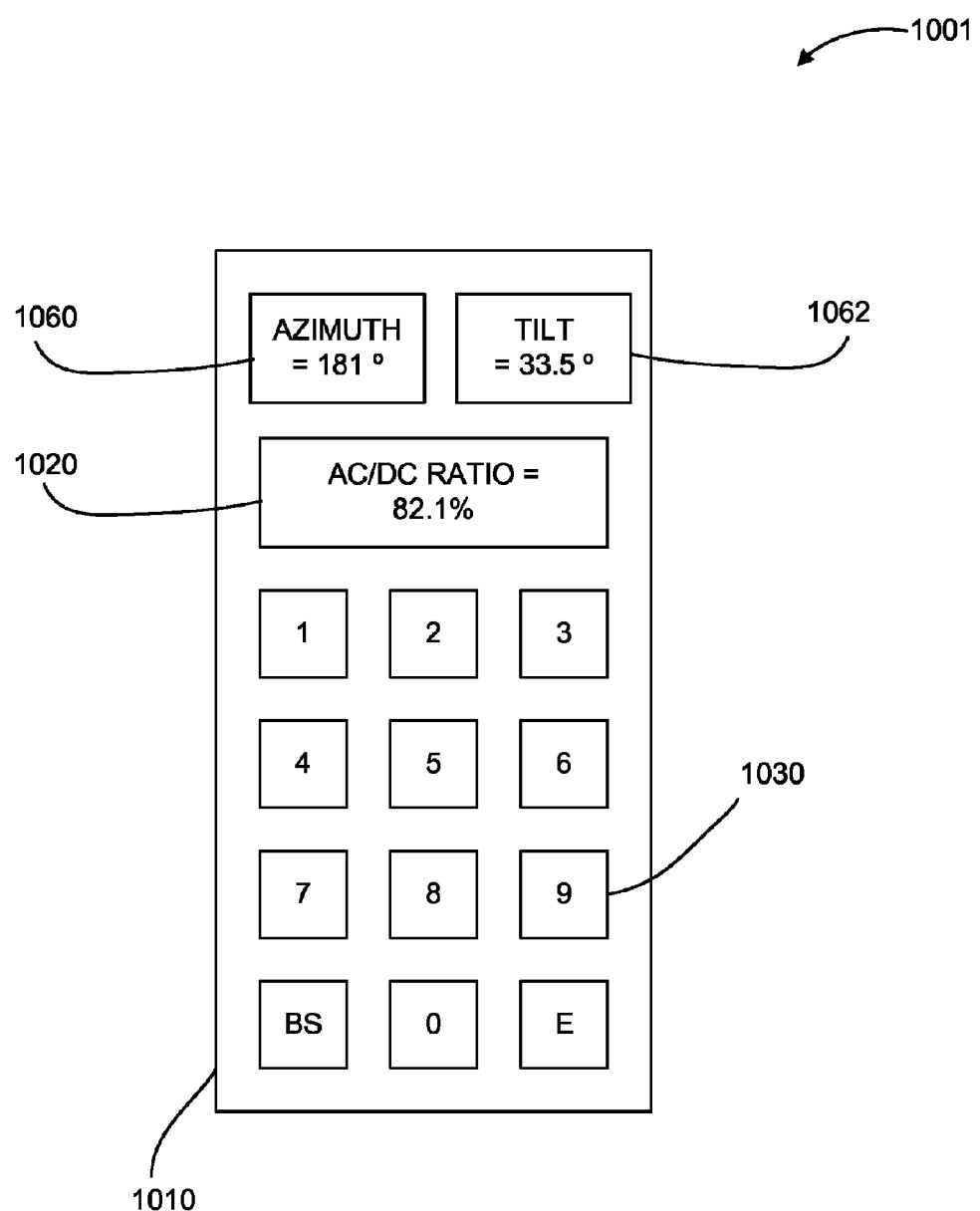
FIG. 10 illustrates an example option for additional sensor orientation information available at a user interface of an efficiency meter.

FIG. 10 illustrates an example option for additional sensor orientation information available at a user interface 1001 of an efficiency meter. The interface 1010 may include additional display information for sensor orientation. It may be important for efficiency meter accuracy that the sensors' physical orientation matches the azimuth and tilt of the power generation system's modules. The interface 1010 may include a keypad 1030 and display 1020 as described earlier. Additional displays for sensor azimuth 1060 and tilt 1062 may be included in the user interface 1010. Positional sensors that are able to determine the orientation of irradiance and temperature sensors may provide the data for these addition displays. Positional sensors may include, but are not limited to, global positioning system circuits, accelerometers, and Hall effect based compass circuitry. Another embodiment may display sensor azimuth and tilt information with the primary display 1020 in which case the display of sensor azimuth and tilt may be included flowchart of the sequential display information. In other embodiments, other parameters may be reported in the displays 1060 or 1062. A keypad and display may be discrete components or may be part of touch screen or other software interface. In other implementations of an efficiency meter, a user interface may exist in another format or may exist in a separate component.

The systems and implementations of photovoltaic efficiency meter for power generation systems discussed above are for illustration purposes and do not constitute a limitation on embodiments. Photovoltaic efficiency meter for power generation systems may be implemented employing other modules, processes, and configurations using the principles discussed herein.

Figure 11:
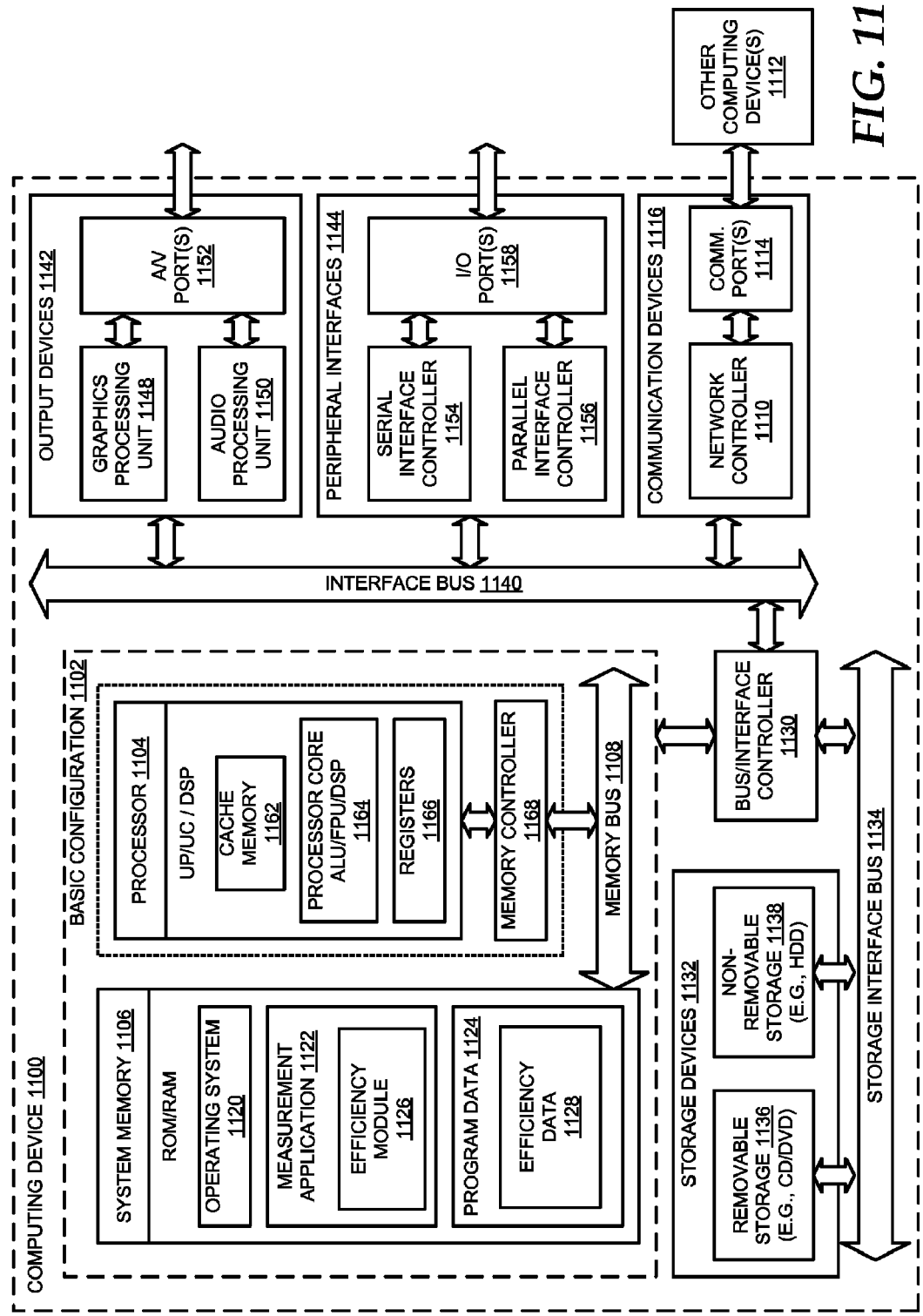
FIG. 11 illustrates a computing environment for a photovoltaic efficiency meter according to embodiments.

FIG. 11 illustrates a computing environment for a photovoltaic efficiency meter according to embodiments. An efficiency meter according to embodiments may be implemented employing one or more special purpose processors or a general purpose computing device such as a portable computer. In a very basic configuration 1102, computing device 1100 typically includes one or more processors 1104 and a system memory 1106. A memory bus 1108 may be used for communicating between the processor(s) 1104 and the system memory 1106.

Depending on the desired configuration, processor 1104 may be of any type including but not limited to a microprocessor (µP), a microcontroller (µC), a digital signal processor (DSP), or any combination thereof. The processor(s) 1104 may include one more levels of caching, such as a level cache memory 1162, a processor core 1164, and registers 1166. The example processor core 1164 may include an arithmetic logic unit (ALU), a floating point unit (FPU), a digital signal processing core (DSP Core), or any combination thereof. An example memory controller 1168 may communicate with system memory 1106 via a bus 1108. An example memory controller 1168 may also be used with the processor(s) 1104, or in some implementations a memory controller 1168 may be an internal part of the processor(s) 1104.

Depending on the desired configuration, the system memory 1106 may be of any type including but not limited to volatile memory (such as RAM), non-volatile memory (such as ROM, flash memory, etc.) or any combination thereof. The system memory 1106 may include an operating system 1120, a measurement application 1122, and program data 1124. The measurement application 1122 may include an efficiency module 1126 that is arranged to estimate an efficiency of a photovoltaic power generation system as discussed above. The program data 1124 may include one or more of efficiency data 1128 and similar data as discussed above in conjunction with at least FIG. 1 through 10. This data may be useful estimating power conversion efficiency of the system under different conditions and taking different system parameters into account as is described herein. In some embodiments, the measurement application 1122 may be arranged to operate with the program data 1124 on an operating system 1120 as described herein. This described basic configuration 1102 is illustrated in FIG. 11 by those components within the inner dashed line.

The computing device 1100 may have additional features or functionality, and additional interfaces to facilitate communications between the basic configuration 1102 and any required devices and interfaces. For example, a bus/interface controller 1130 may be used to facilitate communications between the basic configuration 1102 and one or more data storage devices 1132 via a storage interface bus 1134. The data storage devices 1132 may be removable storage devices 1136, non-removable storage devices 1138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 1106, the removable storage devices 1136 and the non-removable storage devices 1138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 1100. Any such computer storage media may be part of the computing device 1100.

The computing device 1100 may also include an interface bus 1140 for facilitating communication from various interface devices (e.g., output devices 1142, peripheral interfaces 1144, and communication devices 1116 to the basic configuration 1102 via a bus/interface controller 1130. The example output devices 1142 include a graphics processing unit 1148 and an audio processing unit 1150, which may be configured to communicate to various external devices such as a display or speakers via one or more A/V ports 1152. The example peripheral interfaces 1144 include a serial interface controller 1154 or a parallel interface controller 1156, which may be configured to communicate with external devices such as input devices (e.g., keyboard, mouse, pen, voice input device, touch input device, etc.) or other peripheral devices (e.g., printer, scanner, etc.) via one or more I/O ports 1158. An example communication device 1116 includes a network controller 1110, which may be arranged to facilitate communications with one or more other computing devices 1112 over a network communication link via one or more communication ports 1114.

The network communication link connecting communication port(s) 1114 and other computing devices 1112 may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Networks for a networked system, where an efficiency meter such as the one described herein may communicate with other devices, may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such as (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one skilled in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting temperature, wind speed, and similar parameters).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A portable efficiency measurement meter for determining an efficiency of a modular photovoltaic power generation system containing a photovoltaic module circuit and an output power circuit comprising:
    an irradiance sensor;
    a temperature sensor responsive to ambient temperature and an elevated temperature associated with absorption of solar radiation emulating a temperature of power generation photovoltaic modules;
    a communication module;
    a user interface; and
    a processor coupled to the irradiance sensor, the temperature sensor, the communication module, and the user interface, wherein the processor is configured to:
    receive a temperature value from the temperature sensor;
    estimate a cell temperature of the photovoltaic power generation system based on a temperature value from the temperature sensor;
    receive a measured irradiance value from the irradiance sensor;
    estimate a cell irradiance of the photovoltaic power generation system based on measured irradiance value from the irradiance sensor;
    receive an output power value of the photovoltaic power generation system by user input through the user interface;
    estimate an actual photovoltaic module power based on the estimated temperature value and the estimated irradiance value;
    compute a ratio of the estimated actual photovoltaic module power to a rated photovoltaic module power of the photovoltaic power generation system;
    compute an efficiency metric associated with a conversion efficiency of the photovoltaic power generation system based on the ratio of the estimated actual photovoltaic module power to the rated photovoltaic module power; and
    report the efficiency metric through the communication module.

2. The system of claim 1, wherein the efficiency metric is a ratio of the estimated actual photovoltaic module power to the output power of the photovoltaic power generation system.

3. The system of claim 1, wherein the efficiency metric is the ratio of a conversion efficiency to an expected value of the conversion efficiency.

4. The system of claim 1, wherein the efficiency meter is physically and electrically decoupled from the photovoltaic power generation system.

5. The system of claim 1, wherein the irradiance and temperature sensors are in a separate housing from the efficiency meter.

6. The system of claim 1, wherein the efficiency metric is displayed on a touch compatible display device.

7. The system of claim 1, wherein the efficiency meter is further configured to report at least one from a list of: ratio of the estimated actual photovoltaic module power to the output power of the photovoltaic power generation system, an effective cell temperature, a time, a date, a sensor azimuth, and a sensor tilt.

8. The system of claim 1, wherein the irradiance and the temperature sensors are the same sensor.

9. The system of claim 8, wherein at least one of the irradiance and the temperature sensors comprise a plurality of photovoltaic reference cells.

10. The system of claim 1, wherein the temperature sensor includes a back side for one of an open state and a closed state to control air circulation.

11. The system of claim 1, wherein the efficiency meter is further configured to:
    estimate an effect of wind speed on the cell temperature.

12. The system of claim 1, wherein the irradiance sensor, and the temperature sensor use distinct photovoltaic technologies.

13. The system of claim 1, wherein the efficiency meter communicates wirelessly to at least one of other meters and other appliances.

14. The system of claim 1, wherein the system is configured to accept an additional system parameter.

15. The system of claim 14, wherein the additional system parameter is one of a specific value of a photovoltaic cell temperature coefficient and a correction coefficient for correlation between the irradiance sensors and a response of power system cells to irradiance.

16. A portable computing device with efficiency measurement functionality for determining an efficiency of a modular photovoltaic power generation system containing a photovoltaic module circuit and an output power circuit, the portable computing device comprising:
    a memory;
    a user interface;
    an integrated display;
    a communication module;

an attachment comprising temperature and irradiance sensors; and a processor coupled to the memory, the user interface, the integrated display, and the communication module, the processor executing instructions stored in the memory and configured to:

receive a measured temperature value from a temperature sensor;

estimate a cell temperature of the photovoltaic power generation system based on measured temperature value from the temperature sensor;

receive a measured irradiance value from an irradiance sensor;

estimate a cell irradiance of the photovoltaic power generation system based on measured irradiance value from the irradiance sensor;

receive an output power value of the photovoltaic power generation system by user input through the user interface;

estimate an actual photovoltaic module power based on the estimated temperature value and the estimated irradiance value;

compute a ratio of the estimated actual photovoltaic module power to a rated photovoltaic module power of the photovoltaic power generation system;

compute an efficiency metric associated with a conversion efficiency of the photovoltaic power generation system based on the ratio of the estimated actual photovoltaic module power to the rated photovoltaic module power; and display the efficiency metric through the integrated display.

17. The portable computing device of claim 16, wherein the processor is further configured to:

compute the efficiency metric based on: a ratio of the conversion efficiency to an expected value of the conversion efficiency.

18. The portable computing device of claim 16, wherein the processor is configured to report the efficiency metric by at least one from a set of: causing the efficiency metric to be printed, transmitting the efficiency metric to another device through one or a wireless means and a wired means, and storing the efficiency metric at a data store.

19. A smart phone with efficiency measurement functionality for determining an efficiency of a modular photovoltaic power generation system containing a photovoltaic module circuit and an output power circuit, the smart phone comprising:

a memory;

a communication module;

an integrated display;

a pluggable sensor module responsive to at least one of irradiance and temperature and capable of generating power; and a controller configured to:

measure a sensor signal peak power level;

receive a rated sensor value rated power;

calculate a ratio of the sensor signal peak power level to the rated sensor value rated power;

receive a value for an output power rated module power of the photovoltaic power generation system;

receive a value for a rated photovoltaic module power of the photovoltaic power generation system;

estimate a ratio of a photovoltaic module power to the rated photovoltaic module power of the photovoltaic power generation system based on the ratio of the sensor signal peak power level to the rated sensor value rated power;

calculate an efficiency metric associated with a conversion efficiency of the photovoltaic power generation system based on the ratio of the photovoltaic module power to the rated photovoltaic module power of the photovoltaic power generation system;

display the efficiency metric through the integrated display; and report the efficiency metric through the communication module.

* * * * *